United States Patent
Hayasaka (10) Patent No.: US 7,533,217 B2
(45) Date of Patent: May 12, 2009

(54) OPTICAL DISC APPARATUS WITH INTERRUPTIBLE WRITE OPERATION

(75) Inventor: Kaname Hayasaka, Iruma (JP)

(73) Assignee: TEAC Corporation, Tama-shi (JP)

( * ) Notice: Subject to any disclaimer, the term of this patent is extended or adjusted under 35 U.S.C. 154(b) by 270 days.

(21) Appl. No.: 11/270,876

(22) Filed: Nov. 9, 2005

(65) Prior Publication Data

US 2006/0123191 A1    Jun. 8, 2006

(30) Foreign Application Priority Data

Nov. 10, 2004  (JP) .............................. 2004-326989
Dec. 9, 2004   (JP) .............................. 2004-356222

(51) Int. Cl.
*G06F 12/00* (2006.01)

(52) U.S. Cl. ........................ 711/112; 711/113; 711/133; 711/132

(58) Field of Classification Search ................. 711/112, 711/133, 132, 113
See application file for complete search history.

(56) References Cited

U.S. PATENT DOCUMENTS

| | | | |
|---|---|---|---|
| 6,944,717 B2 | 9/2005 | Yoneyama | |
| 2003/0023815 A1 | 1/2003 | Yoneyama | |
| 2004/0019597 A1* | 1/2004 | Nishimura | ................. 707/100 |

FOREIGN PATENT DOCUMENTS

| | | |
|---|---|---|
| JP | 7-93912 | 4/1995 |
| JP | 2000-339856 | 12/2000 |
| JP | 2001-256721 | 9/2001 |
| JP | 2002-077828 | 3/2002 |
| JP | 2003-150447 | 5/2003 |
| JP | 2003-196955 | 7/2003 |

OTHER PUBLICATIONS

Notice of Grounds for Rejection (JP) dated Mar. 4, 2008, issued in corresponding Japanese Application No. 2004-356222.

* cited by examiner

*Primary Examiner*—Hyung S Sough
*Assistant Examiner*—Mehdi Namazi
(74) *Attorney, Agent, or Firm*—Christensen O'Connor Johnson Kindness PLLC (57) ABSTRACT

An optical disc apparatus includes a buffer memory for shared use between write data and read data. Upon receipt of a write command from an external host device, a system controller stores, in a buffer memory, write data attached to the write command, and, after storing the write data, supplies the write data to an optical pickup. When a read command is received after the receipt of the write command, execution of the write command is interrupted at a predetermined time, to store read data retrieved from the optical disc in a recorded area of the buffer memory. Further, a segment of the write data is recorded, and pre-read data retrieved from the optical disc is also stored in the area of the buffer memory, to improve a data hit rate.

7 Claims, 5 Drawing Sheets

OPTICAL DISC APPARATUS WITH INTERRUPTIBLE WRITE OPERATION

BACKGROUND OF THE INVENTION

1. Field of the Invention

The present invention relates to an optical disc apparatus, and more particularly to technology for managing a buffer memory storing data to be recorded and data to be reproduced.

2. Description of the Related Art

In disc apparatuses other than a floppy disc device (FDD) having been widely used as an auxiliary storage device on a computer, such as a hard disc device (HDD), an optical disc apparatus, and the like, a microcomputer is included to realize recording and reproducing of high-volume data at a high speed.

Compared with a HDD, an optical disc apparatus is inferior in random access responsivity because of the weight of an optical head and a head carriage. With this in mind, when recording data in an optical disc apparatus, data associated with a data recording command (hereinafter referred to as "a write command") issued from a host device is received in a buffer memory, and a recording finished status is reported to the host device immediately after the completion of receiving the data, to thereby improve apparent data recording speed viewed from the host device. The optical disc apparatus is configured to actually write data associated with a normal write command on an optical disc only after the data receiving becomes impossible due to depletion of available free space, or after a predetermined period of time has elapsed from the receipt of the last write command. This manner of writing is well known, and is usually referred to as "delayed write". The delayed write is implemented by firmware in a microcomputer, and performance (responsivity) of the disc apparatus viewed from a host varies depending on how the delayed write is performed.

As such a write command issued from a host device, there exist a normal write command and a write command with an FUA (Force Unit Access) bit. Data associated with the write command in which the FUA bit is set is not subjected to delayed write operation, and the received data is recorded immediately after completion of accumulation in the buffer memory. This command is often attached to data which would cause great damage if recording of the data ended in failure, such as directory information constituting a file system in an OS.

When data is recorded on a sector-formatted optical disc apparatus, such as a DVD-RAM, or the like, write data attached to a write command sent from a host device (a host) is received in a buffer memory rather than being actually recorded on the optical disc, and the completion of execution of the command is reported to the host upon finishing the receipt of the data in the buffer memory. In other words, the above-described delayed write is performed. Unrecorded data having been accumulated in the buffer memory is actually recorded on the optical disc at the timing as described below.

(1) Sequential Write

When the write data attached to write commands sequentially sent from the host has continuous LBAs (Logical Block Addresses), it is determined that the data is continuously recorded without a seek operation of an optical pickup, and receiving of the data is continued until a buffer becomes full (a buffer full state). Then, at a time when the buffer enters the full state, or when a predetermined period of time has elapsed without receiving a command from the host after receipt of the last write command, the data recording on the optical disc (real recording) is initiated.

(2) Random Write

When the write data attached to the write commands sequentially sent from the host has discontinuous LBAs, it is determined that a recording operation is performed on discontinuous physical addresses on the optical disc, thereby requiring the seek operation of the optical pickup. Based on this determination, a counter for counting data sets having discontinuous logical block addresses is incremented by +1. The counter is incremented every time the discontinuous write data is received, and when the counter reaches a predetermined value, for example, a value of 10, the real recording is started (the size of the buffer is artificially reduced) regardless of whether or not the buffer full state is reached. Because the seek operation is a time-consuming process and likely to introduce a situation in which the host is kept waiting, or may occasionally raise the possibility that a time-out error is output from the host, it is necessary to perform the writing as described above. It is also possible to initiate the real writing, similarly to the sequential write, at the time when a predetermined period of time has elapsed after receiving the last command even if the counter has not reached the predetermined value.

Japanese Patent Laid-Open Publication No. 2000-339856 discloses a method of using a buffer memory.

Conventionally, in either of the above-described cases (1) and (2), once the real recording on a disc is initiated, it becomes impossible to immediately respond to a read/write command sent from the host until unrecorded data in the buffer memory is entirely recorded.

In the random write, a restriction is imposed using a discontinuity counter to artificially reduce the size of the buffer memory as described above, which can prevent timeout from the host. In the sequential write, on the other hand, high-speed writing is naturally expected from the use of the maximum size of the buffer memory. However, an execution time of the recording is immediately increased once a switching process occurs, which results in a rapid decrease in responsivity. The responsivity is degraded in proportion to the size of the buffer memory, and, at worst, could be degraded to the extent that the host determines a timeout resulting in a bus reset. Even though the size of the buffer memory is increased to improve the responsivity, the increased size would exert an adverse effect upon the occurrence of the switching process. An event of the bus reset means that the recording is interrupted by the host, which might pose a risk of losing user's confidence in the optical disc apparatus.

SUMMARY OF THE INVENTION

The present invention provides a highly reliable optical disc apparatus in which even an increased size of a buffer memory does not raise the possibility of receiving a timeout error from a host.

According to the present invention, write operation can be interrupted at an appropriate time upon receipt of a read command from a host device, to allow execution of the read command even when unrecorded data remains in a buffer memory. Specifically, the interruption of write operation means an action that when free space (a reproduction data storageable area) larger in size than a capacity requested from the read command is created in the buffer memory at the time of generating discrete movement of an optical pickup with respect to physical addresses of the optical disc, such as lens kick, sled seek, or the like, a seek operation for preparing a subsequent write is interrupted to thereby perform processing of the read command.

Here, to perform a write interruption and a read process accompanying the write interruption more efficiently, an area having the minimum amount of capacity for a read is secured in the buffer memory in advance, thereby allowing the read process to be initiated immediately after termination of the seek operation.

Further, when the free space (the reproduction data storageable area) greater in size than the capacity necessary for executing the read command is available at the time of the write interruption, data is pre-read beyond the address specified from the read command. From such pre-reading, quick response to the host device can be expected.

According to the present invention, even when the read command is sent in succession to the write command in sequential write operation, data can be immediately read from the optical disc in response to the read command, which can prevent occurrence of a timeout error being determined by the host device.

BRIEF DESCRIPTION OF THE DRAWINGS

Preferred embodiment of the present invention will be described in detail based on the following figures, wherein.

DESCRIPTION OF THE PREFERRED EMBODIMENT

Referring now to drawings, an embodiment of the present invention will be described below.

Figure 1:
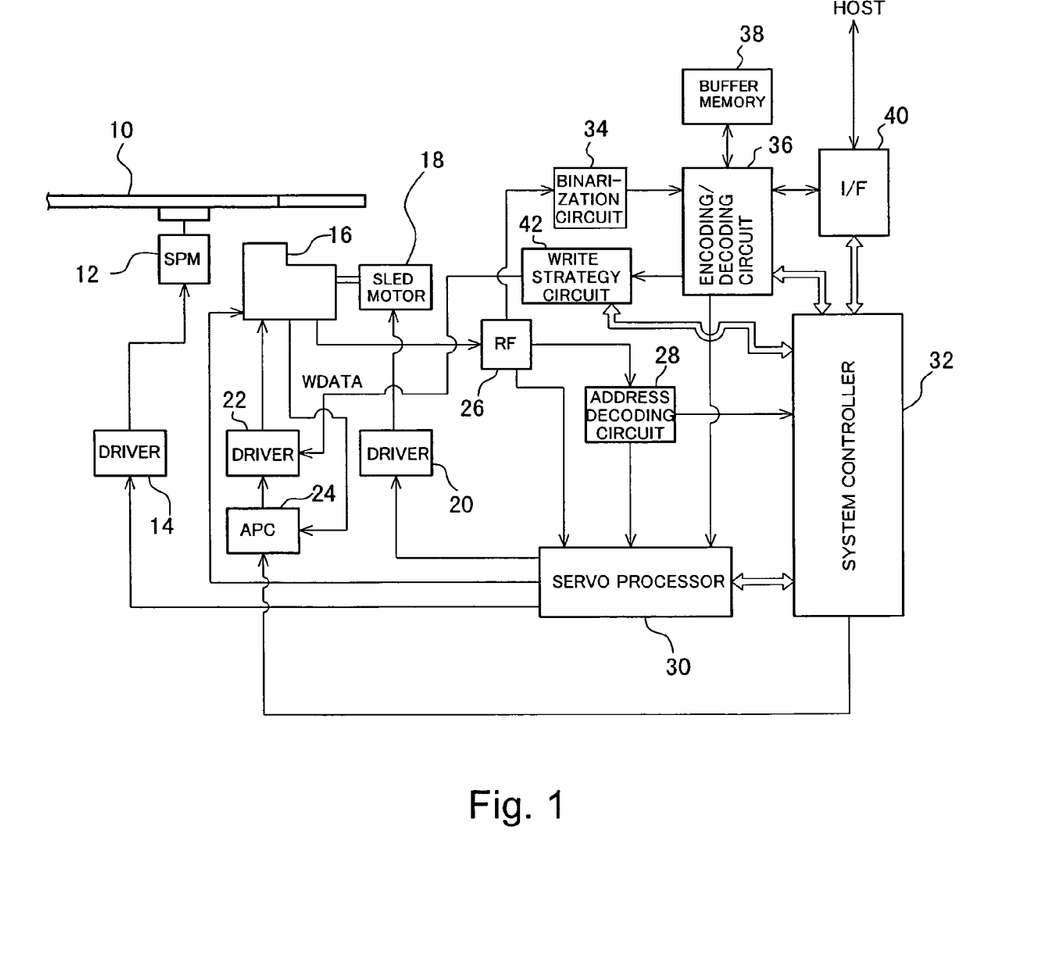
FIG. 1 schematically shows an overall configuration of an optical disc apparatus according to an embodiment of the present invention.

FIG. 1 schematically shows an overall configuration of an optical disc apparatus according to this embodiment of the present invention. A rewritable optical disc 10, such as a DVD-RAM or the like, is rotated by a spindle motor (SPM) 12. The spindle motor SPM 12 is actuated by a driver 14 which is servo-controlled at a desired rotation speed by a servo processor 30.

An optical pickup 16 is comprised of a laser diode (LD) for applying laser light to the optical disc 10 and a photo detector (PD) for converting light reflected from the optical disc 10 into an electrical signal, and is disposed so as to be opposed to the optical disc 10. The optical pickup 16 is driven along a radial direction of the optical disc 10 by a sled motor 18 which is actuated by a driver 20. The driver 20 is servo-controlled, similarly to the driver 14, by the servo processor 30. Further, the LD in the optical pickup 16 is actuated by a driver 22, and the driver 22 is servo-controlled by an automatic power control circuit (APC) 24 to maintain a drive current at a desired value. The APC 24 controls the drive current for the driver 22 so as to obtain an optimum recording power selected in OPC (Optimum Power Control) executed in a test area (PCA) of the optical disc 10. The OPC is a process of recording test data on the PCA of the optical disc 10 while changing the recording power levels in a plurality of levels, evaluating the quality of a signal obtained by reproducing the recorded test data, and selecting a recording power with which a desired signal quality can be obtained. The signal quality is evaluated using a β value, a γ value, a modulation factor, jitter, and the like.

To reproduce data recorded on the optical disc 10, laser light is emitted at a reproduction power from the LD in the optical pickup 16, and reflected laser light is converted by the PD into an electrical signal which is then output. A reproduction signal from the optical pickup 16 is supplied to an RF circuit 26 in which a focus error signal, a tracking error signal, and other error signals are generated from the reproduction signal, and the generated error signals are supplied to the servo processor 30. The servo processor 30 servo-controls the optical pickup 16 according to the error signals to maintain the optical pickup 16 in an on-focus and on-track state. The RF circuit 26 supplies an address signal contained in the reproduction signal to an address decoding circuit 28. The address decoding circuit 28 decodes the address signal into address data for the optical disc 10 and provides the decoded address data to the servo processor 30 and a system controller 32. In a DVD-RAM, address data can be obtained using a CAPA (Complimentary Allocated Pit Addressing) scheme, and the address data existing in a header recorded in a sector is reproduced. The RF circuit 26 further supplies a reproduction RF signal to a binarization circuit 34. The binarization circuit 34 binarizes the reproduction signal to obtain 8-16 modulation signal, and supplies the binarized 8-16 modulation signal to an encode/decode circuit 36. The encode/decode circuit 36 performs 8-16 demodulation and error correction on the supplied binarized signal to obtain reproduction data, and outputs the obtained reproduction data via an interface I/F 40 to a host device, such as a personal computer, or the like. When the reproduction data is output to the host device, the encode/decode circuit 36 temporarily registers the reproduction data in a buffer memory 38, and thereafter outputs the reproduction data from the buffer memory 38.

To record data on the optical disc 10, data to be recorded is supplied from the host device via the interface I/F 40 to the encode/decode circuit 36. The encode/decode circuit 36 stores the data to be recorded in the buffer memory 38, and encodes the data to be recorded as 8-16 modulation data which is then supplied to a write strategy circuit 42. The write strategy circuit 42 converts EFM data into multiple pulses (a pulse train) according to a predetermined recording strategy and supplies the converted multiple pulses to the driver 22 as recording data. The recording strategy is comprised of, for example, the width of the first pulse and the width and duty of subsequent pulses in the multiple pulses. Because the recording strategy affects the recording quality, it is usually fixed to a predetermined optimum strategy. The recording strategy may be specified at the time when the OPC is performed. Laser light is modulated in power according to recording data, and the modulated laser light is emitted from the LD of the optical pickup 16 to record data on the optical disc 10. After the data is recorded, the optical pickup 16 emits laser light at the reproduction power to reproduce the recorded data as a reproduction signal, and supplies the reproduction signal to the RF circuit 26. The RF circuit 26 provides the reproduction signal to the binarization circuit 34 in which the reproduction signal is binarized as 8-16 modulation data. The binarized 8-16 modulation data is supplied to the encode/ decode circuit 36. The encode/decode circuit 36 decodes the 8-16 modulation data, or performs a switching operation when it is not possible to normally decode the 8-16 modulation data. Specifically, recorded data which has been already stored in the buffer memory 38 is recorded in an alternative area.

It should be noted that because DVD-RAMs and the like are a sector format type in which data is recorded in units of 1 ECC block (16 sectors), recorded data of 16 sectors must be stored in the buffer memory 38. Therefore, in order to record data which does not fill the entire volume of the 1 ECC block, the entire volume must be filled in some way to obtain the 1 ECC block of data. There exist plural methods to obtain the I ECC block of data. Among the plural methods, a first method is to access an address of the optical disc 10 corresponding to an address of free space in the buffer memory less than the 1 ECC block, read data stored at the address in the optical disc 10, and pad the buffer memory with the retrieved data. There is a second method used in a case of sequential write operation in which a logical address for the end of data stored in the buffer memory and a logical address for the beginning of data to be supplied subsequently from an external device are continuous. In the second method, the host device is requested to send data of an amount equivalent to the size of the fee space, and the data provided from the host device in response to the request is stored in the free space, thereby filling the free space at the end (the free space at the beginning is filled in a manner similar to the first method). Either of the two methods may be adopted.

In an optical disc apparatus 1 according to this embodiment of the present invention, the buffer memory 38 is controlled by the system controller 32 to perform a well-known delayed write on the optical disc 10. Further, data read from the optical disc 10 is retained as appropriate and used for facilitating reduction of the number of random accesses to the disc. Because in the optical disc apparatus 1 according to this embodiment, the buffer memory 38 has greater capacity (for example, 4 MB) than that of a buffer memory in a conventional optical disc apparatus, the optical disc apparatus 1 can effectively accept large amounts of sequential write data having continuous LBAs. However, as has been well known, an optical disc is vulnerable to dust and dirt, and data recording is not always completed ensuring a stable level of quality. With this in mind, alternative areas are provided on inner and outer tracks of the disc in the DVD-RAM. When a write error occurs in the middle of recording data on the optical disc 10 at a specific location in an area on which recording is performed, data in the area on which the recording failed is recorded in the alternative area because it is necessary for a switching operation to be performed to compensate for the failure. To record data in the alternative area, the optical pickup 16 performs a seek from a track on which the recording has been performed to the alternative area. Such operation accompanied by the seek significantly increases the length of time necessary for recording data. More specifically, when the capacity of the buffer memory 38 is increased, the occurrence of a switching operation in the middle of the sequential write after accepting a write command from the host hampers immediate execution of a read command issued from the host, which increases a risk of causing a bus reset due to a timeout error.

To prevent the bus reset from occurring, the system controller 32 sets a flag representing arrival of a read command upon receipt of the read command while actually recording the write data accumulated in the buffer memory 38 on the optical disc 10. When the presently running write process is finished, the system controller 32 determines whether or not the flag is set. When the flag is set, the system controller 32 suspends a write process scheduled to be performed next time, and checks the current status of usage of the buffer memory 38. Here, the write data contained in the buffer memory 38 is examined to discriminate between data which has already been recorded on the optical disc 10 (recorded data) and data which must be retained in the buffer memory 38 because it has not been recorded on the optical disc 10 (unrecorded data). Then, it is determined whether or not the read command can be executed in an area of recorded data remaining in the buffer memory 38. It should be noted that because the recording on the optical disc 10 is performed in units of 1 ECC block as described above, the recorded data is discriminated in units of 1 ECC block. When, as a result of discrimination, the presence of a recorded data area larger in size than the capacity specified by the read command is found, it is determined that the recorded data area is diverted to a storage area for the read data. Then, a predetermined reproducing operation is performed according to the received read command. In this manner, the recorded data area is diverted to the storage area for the read data in addition to interrupting the data recording operation during the running of the operation at the time of occurrence of random access, thereby allowing prompt execution of the read command to prevent the timeout error from occurring.

When the recorded data area greater in size than the capacity specified in the read command does not exist upon receipt of the read command, a write process scheduled to be performed next time is performed, and the buffer memory 38 is verified to find a recorded data area greater in size than the capacity specified by the write command. The write process is continued until the recorded data area is obtained. When the recorded data area greater in size than the predetermined capacity is secured, the read process is performed prior to the execution of a subsequent write process scheduled to be performed next.

After the read process is completed, a subsequent command from the host is awaited until the time when a predetermined time has elapsed. Even if read commands are successively sent from the host, the commands from the host are accepted and performed as long as the space of the recorded data area existing in the buffer memory 38 allows. When no command is received within the expiration of the predetermined time, the suspended data recording operation is resumed.

Figure 2:
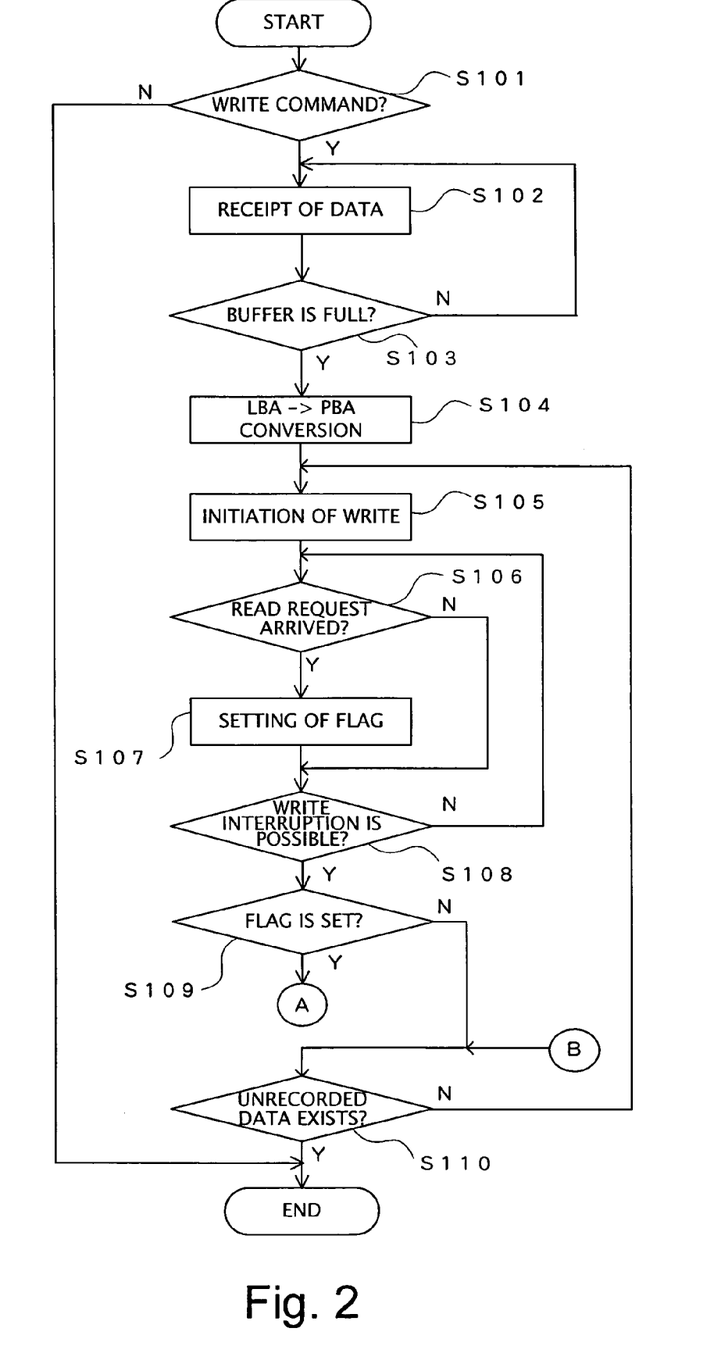
FIG. 2 is flowchart 1 showing process steps according to the embodiment.
Figure 3:
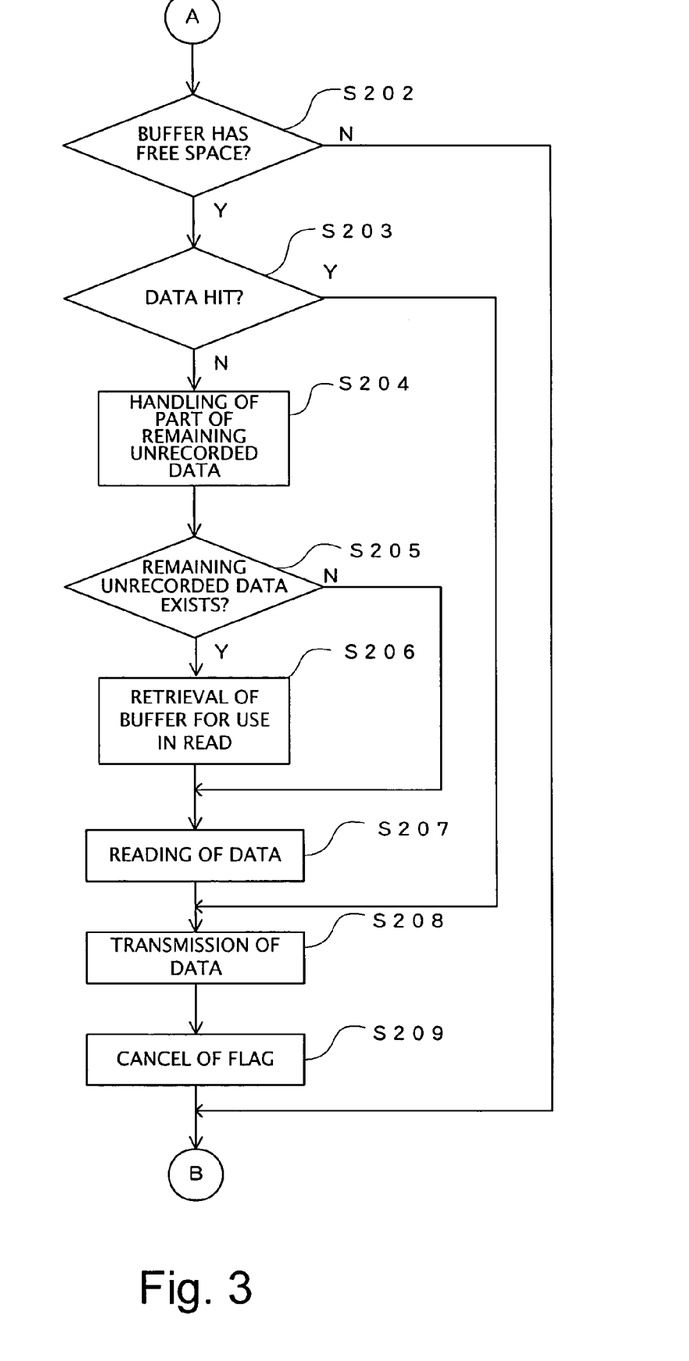
FIG. 3 is flowchart 2 showing process steps according to the embodiment.

FIGS. 2 and 3 show a flowchart of process steps according to the present embodiment. The system controller 32 determines whether or not the command received from the host device is a write command (S101). When determined to be the write command, write data attached to the write command is received and stored in the buffer memory 38 (S102). A process of storing the write data into the buffer memory 38 is continued until the buffer memory 38 is filled to capacity (FULL) (S103). Here, a FULL state of the buffer memory 28 represents a condition in which free space available for use in storing the entire write data from the host device does not exist. The system controller 32 calculates a total capacity of data to be recorded from logical addresses for the beginning and for the end of the write data, and verifies whether or not the total capacity can be included in the free space of the buffer memory 38 to find whether or not the buffer memory 38 is in the FULL state. The process of storing the write data is continued until the entire free space of the buffer memory 38 is filled (exhausted) when logical addresses are continuous in sequential segments of incoming write data. On the other hand, when the logical addresses are discontinuous in the sequential segments of incoming write data, a counter for counting discontinuous data is incremented, and the receiving of the write data is terminated at the time when a count of the discontinuous data exceeds a predetermined value, even though the entire free space of the buffer memory 38 is not filled (exhausted). Termination of the receiving is a control processing for preventing a timeout error resulting from a situation that a reduced access speed associated with sled seek causes the host device to wait longer than necessary.

When the buffer memory 38 is determined to be in the FULL state, the logical addresses of the write data stored in the buffer memory 38 (unrecorded data) are converted into physical addresses on the optical disc 10 (S104). The conversion is performed because the operation of recording data on the optical disc 10 in the optical disc apparatus 1 is configured to perform one write process on a section in which the physical addresses of the optical disc 10 are continuous. In other words, the one write process is a set of operations performed as a unit, which is not interruptible. Even continuous data segments in terms of logical addresses may become discontinuous after the conversion into the physical addresses due to the occurrence of switching operation or the like. Accordingly, the conversion from the logical addresses into the physical addresses is performed prior to execution of the write process, and thereafter the sequence of the write process to be applied to the unrecorded data segments in the buffer is determined according to the physical addresses. Next, write operation to record the unrecorded data segments on the optical disc 10 is invoked (S105). The write operation includes a process of filling free space contained in the 1 ECC block. After configuring write data segments having continuous physical addresses in units of 1 ECC block, the write data segments are sequentially read from the buffer memory 38, encoded, and supplied to the optical pickup 16 for recording data on the optical disc 10. Upon completion of data recording (write operation), a reproducing condition which is slightly stricter than normal reproducing conditions is set, and the write data segments having the same physical addresses are reproduced using the reproduction condition to verify the signal quality. In the event that the data is not normally decoded due to the occurrence of a readout error, or the like, the data is alternatively recorded on an alternative area.

The system controller 32 interrupts the write operation to determine whether or not a read command is received from the host device during the running of the write operation (S106). While no read command is received, the write operation is continued until the entire volume of the write data stored in the buffer memory 38 is recorded on the optical disc 10 (S108, S110). When the read command is received, on the other hand, the flag representing arrival of the read command is set (S107). Then, whether or not the flag is set is confirmed (S109) at the time when the present write process can be interrupted (S108). When the flag is set, the received read command is executed while performing the process steps described below, thereby preventing the timeout error.

FIG. 3 shows process steps when the write operation is interrupted upon receipt of the read command. The system controller 32 determines whether or not the buffer memory 38 includes free space (a recorded data area) available for use in responding to a request of the read command (S202). When the most capacity of the buffer memory 38 is occupied by the unrecorded data (it should be noted that the recording is determined to be complete not when data is recorded on the optical disc 10, but when the data recorded on the optical disc 10 is verified), thereby having no sufficient free space for use in responding to the request for the read command, the read command cannot be executed. Therefore, operation returns to process step S110 and the write process described in process steps S105 onward is continued to create available free space. Here, the free space refers to an area of the buffer memory 38 where no unrecorded data is contained because the apparatus is in a state immediately activated, or an area including recorded data which have been already recorded on the optical disc 10 and is not required to be stored in the buffer memory 38.

The buffer memory 38 is in a state of readiness to store the read data retrieved from the optical disc 10 whenever the buffer memory 38 has free space for use in responding to the request from the read command. With this in mind, the system controller 32 determines whether or not the data requested from the read command already exists in the buffer memory 38 (S203). When the requested data has already been retrieved and contained in the buffer memory 38, or the unrecorded data remaining in the buffer memory 38 corresponds to the requested data (data hit or cash hit), the corresponding data in the buffer memory 38 is transferred to the host device without being processed (S208). By transferring the data, processing of the read command is completed, thereby canceling the flag that had been set (S209). When no data hit is encountered, it is necessary to retrieve the data from the optical disc 10. Because it is conceivable that read commands will be issued in succession, data stored at an address following the address of the requested data is retrieved in advance instead of simply retrieving the data stored in the address requested by the read command, which can facilitate improvement in percentage of occurrence of cache hits to be encountered in the next read command. Further, when the read commands are successively issued, it is not preferred for the unrecorded data to continue to reside in the buffer memory 38. It is therefore required to finish the handling of the unrecorded data segment as soon as possible and free enough space of the buffer memory 38 to allow the maximum response to the read commands anticipated as being sent from the host device in succession. To realize prompt release of the buffer memory 38, processes of recording unrecorded data are sequentially completed one by one for pushing forward the handling of the unrecorded data area, thereby further securing the recorded data area (a free data area). In process step S204, the recording process is a write process in which data having continuous physical addresses are written, and when the write process is interrupted immediately before a verification process, the unfinished verification process takes precedence over another write process. Next, whether or not unrecorded data still exists is determined (S205). When the unrecorded data is not found, the entire space of the buffer memory 38 is in readiness to be used as a read data storing area. When the unrecorded data still remains, on the other hand, the buffer memory 38 is searched to find an available buffer area to store the read data (S206). Then, data (including requested data and pre-read data) is retrieved from the optical disc 10, and the retrieved data is stored in the found available buffer area (S207). After storing the read data in the buffer memory 38, the read data is passed to the host device from the buffer memory 38 (S208), and the flag is reset (S209) to complete the read process. It should be noted that the read data storing area may be diverted as an area to store new read data similarly to the recorded data area. More specifically, when the data hit did not occur in process step S203 upon receipt of the read command, the read data storing area would be used for the read process and the pre-read process in conjunction with the recorded data area.

When processing of the read command is completed after interrupting the continuing write operation as described above, processing of the write command is resumed. Then, upon completion of recording all the remaining write data, operation is ended (S109, S110).

FIGS. 4 to 7 schematically show a state of the buffer memory 38 in each step of the above-described operation. Although the size of the buffer memory 38 may be specified as appropriate, the buffer memory 38 is configured, in FIGS. 4 to 7, to have a capacity capable of storing data of 6 ECC blocks for convenience of description.

Figure 4:
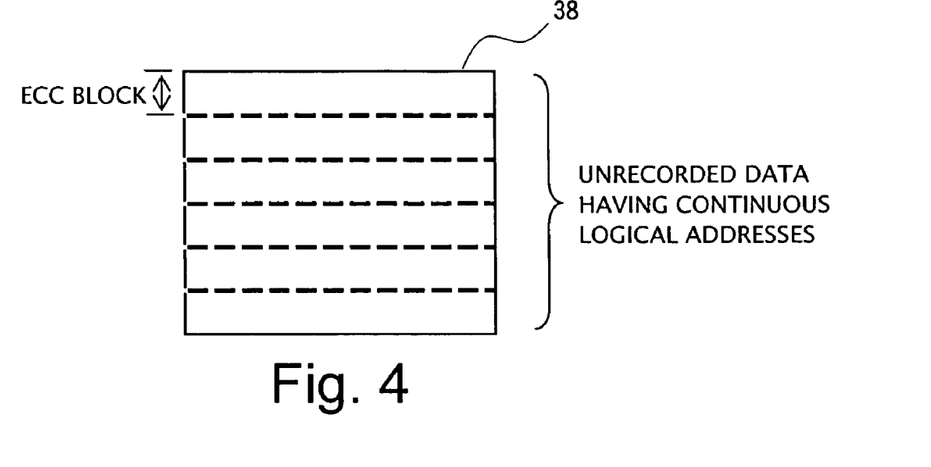
FIG. 4 is a diagram for explaining a state of a buffer memory.
Figure 5:
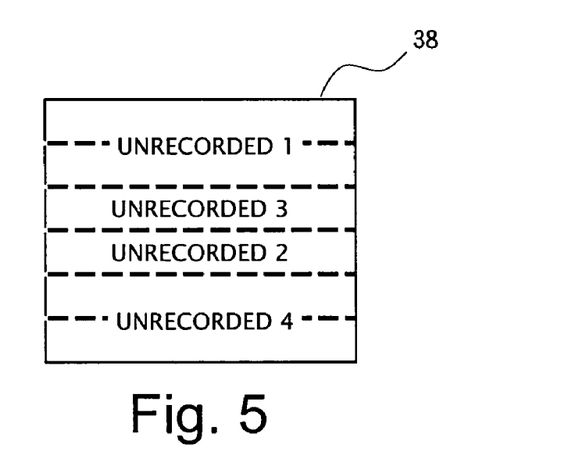
FIG. 5 is a diagram for explaining another state of the buffer memory.

FIG. 4 shows a state in which the FULL state is determined after storing the write data having continuous physical addresses and supplied from the host device, in other words, the state in which YES is determined in process step S103 shown in FIG. 2. The blocks are referred to, from above, as first to sixth data areas (each data area has a capacity equivalent to 1 ECC block). Because all of the first to sixth data areas store the write data, and the recording of data on the optical disc 10 is not yet finished, the write data is in an "unrecorded" state. FIG. 5 shows a state in which after performing logical/physical address conversion on the data in the state shown in FIG. 4, the unrecorded data is divided into segments by unit of physical address, and sequence numbers are assigned in accordance with the physical address to the data segments in the order in which the data segments are recorded. In FIG. 5, from above, a data segment "unrecorded 1" composed of data with continuous physical addresses corresponding to 2 ECC blocks, a data segment "unrecorded 3" composed of data with continuous physical addresses corresponding to 1 ECC block, a data segment "unrecorded 2" composed of data with continuous physical addresses corresponding to 1 ECC block, and a data segment "unrecorded 4" composed of data with continuous physical addresses corresponding to 2 ECC blocks are stored. The recording process is performed on the data segments "unrecorded 1", "unrecorded 2", "unrecorded 3", and "unrecorded 4" in that order of physical addresses. As can be seen in FIG. 5, in the recording process of actually recording data on the optical disc 10, the logical addresses are continuous, while the physical addresses are discontinuous at the occurrence of the switching operation. Therefore, when viewed with reference to the physical addresses, the recording sequence could be altered.

Figure 6:
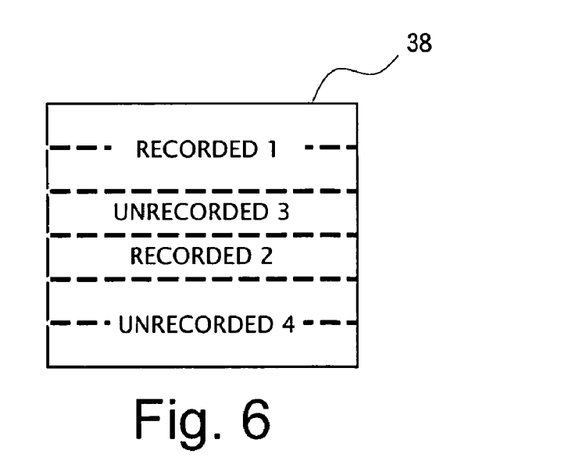
FIG. 6 is a diagram for explaining a further state of the buffer memory.

FIG. 6 shows a state in the middle of sequentially performing the data recording in units of ECC blocks being continuous in terms of the physical addresses in which the data segments "unrecorded 1" and "unrecorded 2" contained in the buffer memory 38 are already recorded. At this point in time, process step S105 shown in FIG. 2 has been performed twice. In this state, the data segments indicated as "unrecorded 1" and "unrecorded 2" in the previous state are recorded (data is recorded on the optical disc 10 and also verified), and represented as data segments "recorded 1" and "recorded 2". Because there is no necessity to actively store the data in the recorded data areas, the recorded data area is in a condition of readiness for overwrite, in other words, in a state of being free space.

Figure 7:
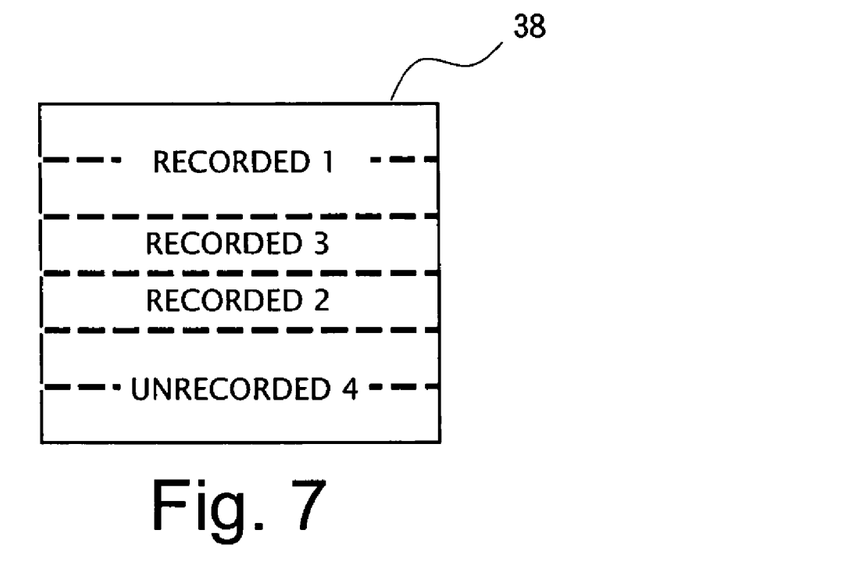
FIG. 7 is a diagram for explaining a still further state of the buffer memory.

FIG. 7 shows a state where prior to execution of processing for the read command after setting the flag (S107) and interrupting the write process (S108, S109) upon receipt of the read command issued from the host device (S106), in addition to processing the unrecorded data as much as possible, a segment of the unrecorded data is recorded to secure pre-read data space, i.e. a state that process step S204 shown in FIG. 3 has been performed. Also in the state shown in FIG. 6, there exists available free space (segments of "recorded 1" and "recorded 2") for use in responding to the request from the read command. However, when only the data requested by the read command is stored, for example, in the segment "recorded 1", continuously issued read commands would cause a situation that data must be read from the optical disc 10 every time, resulting in reduction of efficiency. Further, the unrecorded data continuously remains in a delayed state at the occurrence of the read commands being successively issued, which can have not only the adverse effect on efficiency of the read process but also a risk that an accidental problem, such as abnormal power down, would result in critical data crash. Unrecorded data should be processed as soon as possible. On account of this, the data segment "unrecorded 3" of the unrecorded data is recorded on the optical disc 10 so as to be configured as the data segment "recorded 3" as shown in FIG. 7, thereby creating free space. In this manner, in addition to the data segment requested from the read command, a data segment following the requested data segment can be pre-read and stored in the segments "recorded 2" and "recorded 3", which can raise the expectation that occurrence of the data hit will improve reading speed. In addition, when the read commands are successively issued, resulting in no data hit encountered in the buffer memory 38 (S203 of FIG. 3), the unrecorded data segments are gradually recorded (S204) before processing the read commands, to allow disposal of the unrecorded data at the earliest possible time. Although a status transition from "unrecorded 3" to "recorded 3" unintentionally results in the presence of successive recorded areas "recorded 1", "recorded 2", and "recorded 3" of 4 ECC blocks in the state shown in FIG. 7, it should be noted that the recorded areas in the buffer memory 38 are not necessarily used according to a layout of continuous addresses.

Figure 8:
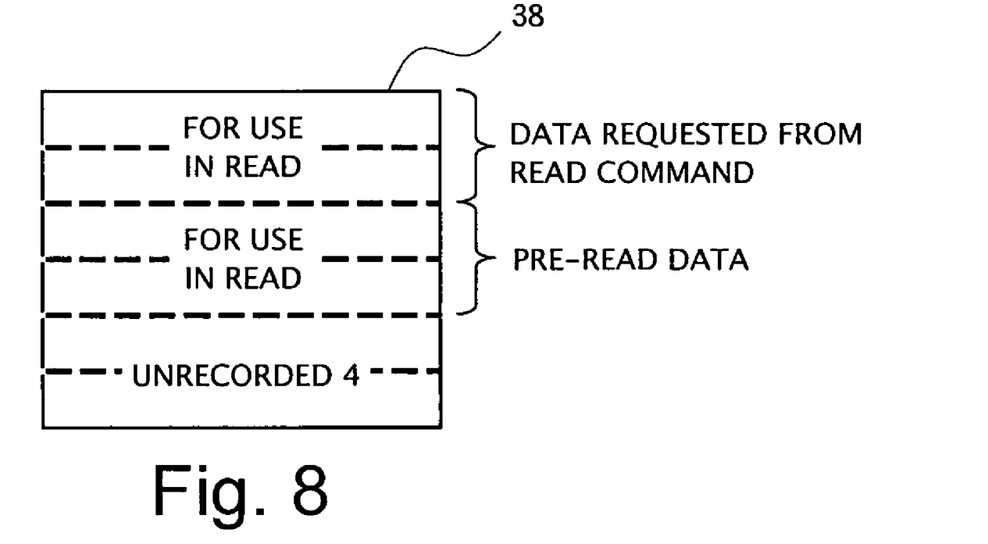
FIG. 8 is a diagram for explaining still another state of the buffer memory.

FIG. 8 shows a state in which after performing the write operation on a segment of the unrecorded data to create further free space, data read from the optical disc 10 is stored in the buffer memory 38, i.e. a state in which process step S207 of FIG. 3 is complete. The segment "recorded 1" stores data of 2 ECC blocks requested from the read command, and the segments "recorded 2" and "recorded 3" stores the pre-read data of 2 ECC blocks. The data stored in the segment "recorded 1" is subsequently transferred to the host device (S208 of FIG. 3). When another write command is issued from the host device, recording of the remaining data segment "unrecorded 4" is completed to realize a state that unrecorded data does not exist in the buffer memory 38, and then receiving of data is re-started (S101, S102).

Although the present invention has been described in its preferred form, it is to be understood that this invention is not limited to the specific embodiment, and changes and variations may be made.

For example, the system controller 32 controls the writing/reading of data from/in the buffer memory 38 in the above-described embodiment, but a memory controller other than the system controller 32 may control the writing/reading.

Although a part of the remaining write data is recorded on the optical disc 10 prior to the execution of the read command, thereby securing an area to store the pre-read data for increasing the rate of occurrence of the data hit (cash hit), the process of reading data may be performed without executing process step S204. When the process step S204 is not executed, the capacity of existing free space is checked. Then, when the amount of data requested from the read command is smaller than the checked capacity, data corresponding to a difference between the amount and the checked capacity is pre-read and stored in the buffer memory 38.

Further, although the buffer memory 38 is not logically divided into an area for storing the write data and an area for storing the read data retrieved from the optical disc 10, a part of the buffer memory 38 may be allocated to a read data specific area as in the case of conventional technology. In this case, because the area to store the read data always exists, it is not necessary to check whether or not the buffer has free space in process step S202.

What is claimed is:

1. An optical disc apparatus comprising:
   a buffer memory which stores data to be recorded on an optical disc and stores data read from the optical disk;
   a determination unit in which, upon receipt of a read command from an external device after receiving write data with continuous logical addresses in the buffer memory until the buffer memory is filled with the write data according to a write command supplied from the external device, it is determined in units of a predetermined amount of data whether or not a free data area including at least a recorded data area for responding to an amount of data requested from the read command exists in a data area of the buffer memory; and
   a controller which interrupts a process of recording the write data in order of physical addresses of the optical disc when the free data area for responding to the amount of data requested from the read command is determined to be present, and after interruption, reads data from the optical disc according to the read command and stores the read data in the free data area.

2. The apparatus according to claim 1, wherein the controller performs, without interruption, a process of recording, on the optical disc, a segment of data in the data area where recording onto the optical disc is not completed, to thereby increase the free data area, and stores data retrieved from the optical disc according to the read command together with pre-read data following the data retrieved according to the read command in the increased free data area.

3. An optical disc apparatus comprising:
   a buffer memory for storing data to be recorded on an optical disc and data read from the optical disc, in which a read data specific area for storing the data read from the optical disc is provided, and
   a controller which, upon receipt of a read command from an external device after receiving write data with continuous logical addresses in the buffer memory until the buffer memory is filled with the write data according to a write command supplied from the external device, interrupts a process of recording the write data in order of physical addresses of the optical disc, reads data from the optical disc according to the read command, and stores the data having been read according to the read command and pre-read data following the data having been read according to the read command in the read data specific area and a free data area including at least a recorded data area.

4. An optical disc apparatus comprising:
   a buffer memory for storing data to be recorded on an optical disc and storing read data retrieved from the optical disc, and
   a controller which, upon receipt of a read command in succession to a write command from an external device, executes the read command using available free space in an area of the buffer memory as a storage area for the read data while interrupting the write command,
   wherein, even when unrecorded data is contained in the buffer memory, the controller interrupts a process of recording the unrecorded data, executes the read command, and resumes the process of recording the unrecorded data after executing the read command.

5. An optical disc apparatus comprising:
   a buffer memory for storing data to be recorded on an optical disc and storing read data retrieved from the optical disc, and
   a controller which, upon receipt of a read command in succession to a write command from an external device, executes the read command using available free space in an area of the buffer memory as a storage area for the read data while interrupting the write command,
   wherein, when a capacity of a recorded data area in the area of the buffer memory is less than an amount of read data requested from the read command, the controller executes a process of recording a segment of unrecorded data until the capacity of the recorded data area exceeds the amount of read data, and thereafter executes the read command, and resumes the process of recording a remaining segment of unrecorded data after executing the read command.

6. An optical disc apparatus comprising:
   a buffer memory for storing data to be recorded on an optical disc and storing read data retrieved from the optical disc,
   a controller which, upon receipt of a read command in succession to a write command from an external device, executes the read command using available free space in an area of the buffer memory as a storage area for the read data while interrupting the write command, and
   an optical pickup capable of performing a seek, which emits laser light on the optical disc for recording and reproducing data,
   wherein the controller executes the read command at a time when the seek of the optical pickup is needed.

7. An optical disc apparatus comprising:
   an optical pickup,
   a buffer memory for storing data to be recorded on an optical disc and read data retrieved from the optical disc, and
   a controller which, upon receipt of a read command after receiving a write command from an external device, interrupts execution of the write command, suspends a seek, and executes the read command at a time when the seek of the optical pickup is performed while free space larger in size than an amount of data requested from the read command is created in the buffer memory,
   wherein the controller pre-reads, from the optical disc, data stored at an address subsequent to an address of read data retrieved according to the read command and stores the pre-read data together with the read data retrieved according to the read command in the free space.

* * * * *